United States Patent
Faugeras et al.

[11] 4,029,733
[45] June 14, 1977

[54] EXTRACTION OF METALS FROM SEA NODULES

[75] Inventors: Pierre Faugeras, Versailles; Pierre Miquel, Chatillon; Michéle Robaglia, Orsay, all of France

[73] Assignee: Commissariat a l'Energie Atomique, Paris, France

[22] Filed: Feb. 11, 1975

[21] Appl. No.: 549,046

[30] Foreign Application Priority Data

Feb. 28, 1974 France .................. 74.06888

[52] U.S. Cl. .................. 423/21; 423/24; 423/41; 423/50; 423/54; 423/55; 423/100; 423/109; 423/112; 423/122; 423/132; 423/139; 423/140; 423/150; 75/115

[51] Int. Cl.² .................. C01G 3/10; C01G 53/10

[58] Field of Search .............. 423/24, 27, 112, 139, 423/140, 150, 49, 50, 54, 21, 41, 55, 122, 132; 75/101 BE, 115, 117, 119, 121; 204/108

[56] References Cited

UNITED STATES PATENTS

| | | | |
|---|---|---|---|
| 2,340,188 | 1/1944 | Jukkola | 423/49 X |
| 2,584,700 | 2/1952 | Hayward | 423/57 |
| 3,106,451 | 10/1963 | Globus | 75/115 |
| 3,402,042 | 9/1968 | Lichty | 423/139 |
| 3,479,378 | 11/1969 | Orlandini et al | 75/117 X |
| 3,514,266 | 5/1970 | Nicols et al. | 423/112 |
| 3,666,446 | 5/1972 | Cook et al. | 75/101 BE |
| 3,795,596 | 3/1974 | Kane et al. | 75/121 X |
| 3,810,827 | 5/1974 | Kane et al. | 75/119 X |
| 3,812,232 | 5/1974 | Bauer et al. | 423/22 |
| 3,923,615 | 12/1975 | Kane | 423/140 X |

OTHER PUBLICATIONS

Ritcey et al. "Some Aspects of the Extraction of Metal from Acidic Solutions by Kelex 100" C.I.M. Bulletin Feb., 1974 pp. 87–92.

Ehrlich, Editor *Copper Metallurgy*, A.I.M.E. New York, N.Y. 1970 p.72.

Primary Examiner—O. R. Vertiz
Assistant Examiner—Brian E. Hearn
Attorney, Agent, or Firm—Lane, Aitken, Dunner & Ziems

[57] ABSTRACT

The method comprises the steps of crushing of the ore, neutralization by a mixture of water and sulphuric acid, introduction of a controlled quantity of sulphur dioxide gas at a pH value between 1.5 and 4 for promoting dissolution of nickel, copper and a desired quantity of manganese, leaching of the ore with sulphuric acid at a pH value between 1 and 3 for selectively dissolving the nickel and copper, separation of the solid and liquid phases, and separation of the metals contained in the liquid phase.

8 Claims, 1 Drawing Figure

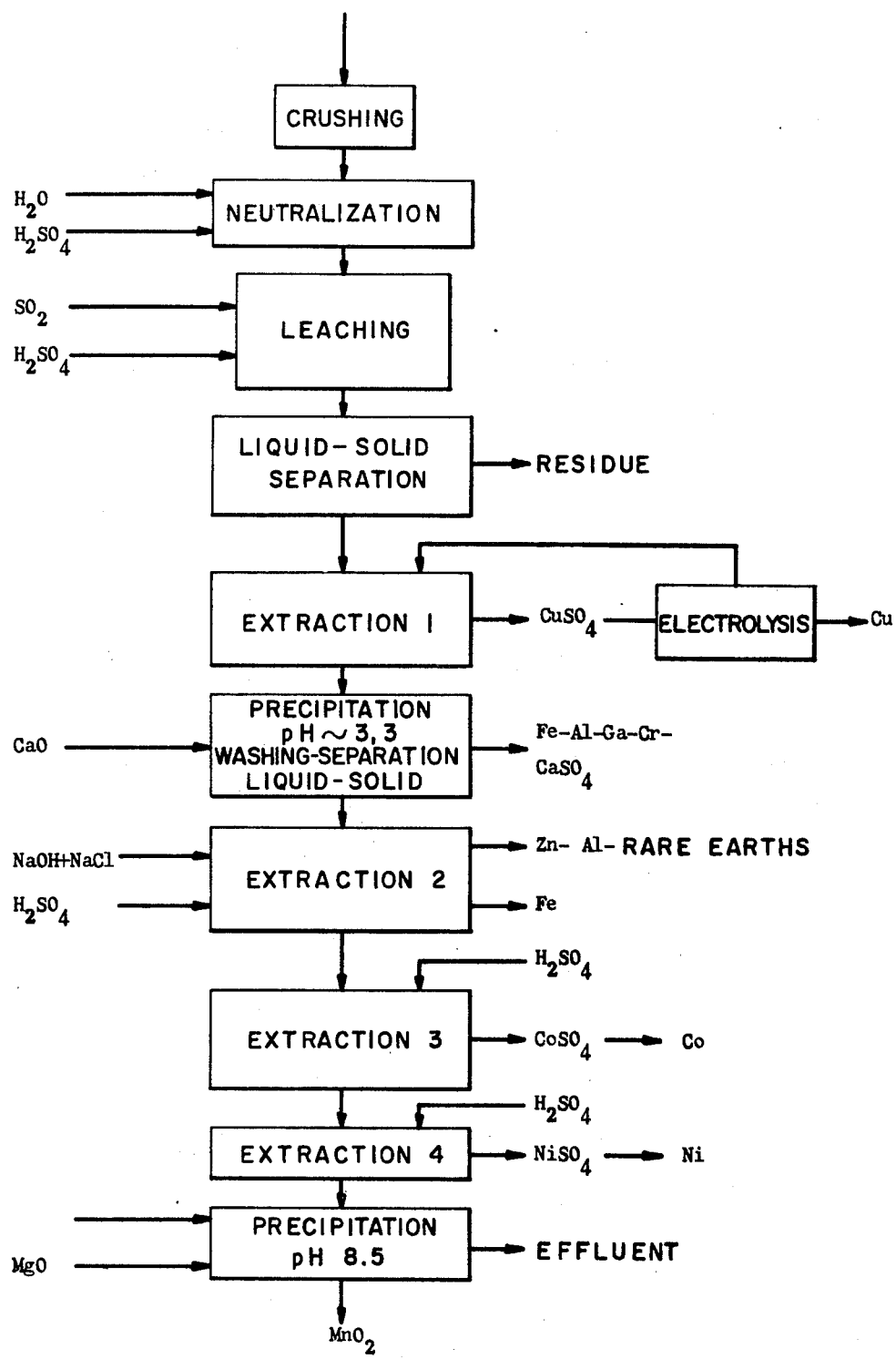

EXTRACTION OF METALS FROM SEA NODULES

This invention relates to a method of extraction of nickel and of copper contained in ores of the type constituted by the manganiferous nodules of deep-sea beds.

The nodules formed in the deep-sea beds are known as manganese nodules since their main constituent is $MnO_2$. The appearance of these nodules and the mean concentration of metals in these latter according to the ocean zones in which they occur have been described in detail by J.L. Mero, in particular in U.S. Pat. No. 3.169.856 which gives a list of the principal metals contained in the nodules and their concentrations.

The following composition can be given by way of examples:

| Mn | 8 | to | 40 | % |
|---|---|---|---|---|
| Fe | 3 | to | 25 | % |
| Al | 0.5 | to | 3 | % |
| Ni | 0.7 | to | 2 | % |
| Cu | 0.5 | to | 1.6 | % |
| Co | 0.1 | to | 0.5 | % |
| Zn | 0.05 | to | 0.12 | % |
| Ce | 0.1 | % | | |
| Mo | 0.03 | to | 0.1 | % |
| La | 0.026 | % | | |
| Ga | 0.001 | to | 0.023 | % |
| Nd | 0.022 | % | | |
| Sn | 0.008 | to | 0.01 | % |
| Cr | 0.007 | to | 0.01 | % |
| Sm | 0.005 | % | | |
| Cd | 0.0005 | % | | |
| K | 0.7 | to | 3 | % |
| Na | 1 | to | 3 | % |
| Mg | 0.5 | to | 2.8 | % |
| Ca | 0.8 | to | 3 | % |
| $SiO_2$ | 12 | to | 20 | % |

The recovery of nodules by dredging, injection of air or hydraulic pumping is being studied and has formed the subject of a large number of patents among which can be cited U.S. Pat. Nos. 3,226,854, 3,456,371, 3,480,326, 3,504,943, Canadian patents Nos: 928,337 and 928,338 and French patent No. 2,067,797.

Among the recoverable metals, nickel and copper offer the most attractive prospects since world reserves of nickel and copper are decreasing rapidly and it is becoming advantageous to process low-grade ores. Cobalt, zinc, gallium, tin, the rare earths are contained in nodules at concentrations such that the recovery of these metals can have the effect of increasing the commercial value of the ore if the recovery operation is not a costly one. The metal value of iron is of no interest on account of its low concentration and the many impurities which are also present. Manganese, which is the main constituent of nodules, is not strictly speaking a non-recoverable metal. But the exploitation of nodules is contemplated with a view to making up for depleted resources of nickel and copper; so far as these two metals are concerned, the market requirements would actually lead to overproduction of manganese if all the manganese contained in nodules were recovered. It is for this reason that a simple and inexpensive process which makes it possible to separate nickel, copper and a part of the other metals contained in nodules while leaving the iron in the steriles becomes particularly attractive if such a process makes it possible at the same time to recover the desired quantity of manganese progressively as markets develop.

Processing of nodules is usually carried out by three different methods. In accordance with a first method described in French patents Nos. 2.098,453, 2,098,454, 2,098,455, 2,113,978 and the German Application No. DOS 2,135,731, a reduction is carried out and this is followed by leaching with ammonia. In accordance with a second method described in French patent No. 2.090,301, an attack is carried out with hydrochloric acid and with steam. In accordance with a third method described in French patent No. 2,090,300, U.S. Pat. No. 3.169,856 and the German patent Application No. DAS 2.150,785, an attack is carried out with sulphurous anhydride in an aqueous medium.

These methods suffer from a disadvantage in that they entail the use of costly apparatus so far as the first two methods are concerned or that they result in total recovery of the manganese in the case of the last two methods mentioned.

In accordance with the invention, these disadvantages have now been successfully overcome by adopting a method which permits recovery of copper and nickel while making it possible to control the production of manganese at will.

The invention is directed to a method of extraction of certain metals, especially nickel and copper contained in ores of the type constituted by the manganiferous nodules of deep-sea beds, said method being essentially distinguished by the fact that it comprises the steps of:

a. crushing of the ore;

b. neutralization by attack of the crushed ore by means of a mixture of water and sulphuric acid;

c. introduction of a controlled quantity of sulphur dioxide gas corresponding to the stoichiometry of the reaction of sulphation of manganese dioxide by sulphur dioxide at a pH value within the range of 1.5 to 4 with agitation in order to break down the ore structure and promote subsequent dissolution of the metals, especially nickel, copper and the desired quantity of manganese;

d. leaching of the ore with sulphuric acid at a pH value within the range of 1 to 3 in order to selectively dissolve the nickel and the copper;

e. separation of the solid and liquid phases;

f. separation of the metals contained in the liquid phase.

The injection at a predetermined pH value of very small quantities of sulphur dioxide into the leach solution forming a pulp with the ore has the effect of accelerating the desorption of the nickel and the copper, and of appreciably improving the recovery of these metals without increasing the rate of dissolution either of iron or of manganese if so desired. Should it be found necessary to solubilize larger quantitites of manganese, it is only necessary to increase the time of injection of $SO_2$ in order to produce larger quantitites of manganese. When this injection has been carried out, desorption of the nickel and the copper can be completed by continuing the process of leaching with sulphuric acid.

The method under consideration has been applied in accordance with the main steps which are illustrated schematically in the accompanying figure.

The nodules containing manganese, iron, copper, nickel, cobalt, zinc and other metals were first crushed to a particle size below 160 microns corresponding to a screen size of 23-mesh but this value is not given by way of limitation and the method is equally applicable to particle sizes corresponding to 20 to 45-mesh screens. The crushed ore was then mixed with fresh water or sea water acidulated with sulphuric acid having a small pH value in the vicinity of 2 so as to form a pulp containing up to 50% of solids. The quantity of ore contained in this pulp is not an essential point but must be such that the mixture behaves as a fluid. The pH value of the solution which has risen to approximately 6 in contact with the ore was restored to between 4 and 2 by sulphuric acid. This operation which does not give rise to any solubilization of metals is known as ore neutralization. At this moment a well-determined quantity of sulphurous anhydride (sulphur dioxide) was injected into the pulp by percolation for example, while maintaining regular agitation of the pulp. The $SO_2$ makes it possible to break down the surface structure of the manganese lattices and to open the pores in order to facilitate subsequent diffusion of the metal ions. Moreover, the sulphurous anhydride causes practically instantaneous dissolution of 3 to 15% of the nickel or more, part of the cobalt and 1 to 10% of the manganese or more, depending on the quantity of sulphurous anhydride injected. This quantity which determines the rate of recovery of manganese can be calculated by taking account of the stoichiometry of the reaction of sulphation of manganese dioxide by the sulphurous anhydride.

The progressive variation of the pH value, however, also serves to produce indications since the pH value in fact rises by one-tenth of a unit each time 3 to 4% of the manganese is dissolved.

After injection of $SO_2$, leaching of the nodules was continued with sulphuric acid at a controlled pH. Dissolving of the nickel and the copper was then continued rapidly, thus attaining in about 6 hours the yields obtained in about 60 hours by simple sulphuric acid leaching on the same ore and under the same conditions. Moreover, when the leaching process was continued, the limit of the yields obtained exceeded by 10 to 20% the limit of the yields obtained by simple sulphuric acid leaching.

After the leaching process, the solution containing nickel, copper, manganese and other metals was separated from the unattacked ore. The steriles were washed and could then be subjected to conventional metallurgical processing when it was desired to recover the fraction of cobalt which had remained in the steriles. This method of leaching was performed indifferently in countercurrent operation, continuous operation or batchwise.

It has been observed that the kinetics of dissolution of the metals depended on the temperature, the pressure, the agitation of the pulp and the pH value of leaching with $H_2SO_4$, but such variables are neither critical nor essential for the good performance of the process.

EXAMPLE 1

Influence of sulphurous anhydride on the sulphuric acid leaching process

By following the general method outlined above, 100 g of manganese nodules were attached at 60° C after crushing to 160 $\mu$ and reducing to pulp with 300 g of water. The composition of the nodules was as follows: Mn 21.5%, Fe 6.8%, Ni 0.97%, Cu 0.70%, Co 0.20%, $H_2O$ 13.8% (at 110° C). These percentages are expressed by weight with respect to dry material.

The injection of about 0.5 liter of $SO_2$ was carried out at a pH of 3 and the pH was increased to the value of 3.2. Sulphuric acid leaching was performed at a pH of 1.5. Table 1 below gives the dissolution kinetics obtained. By way of comparison, this table also records the dissolution kinetics obtained under the same conditions of temperature, pulp consistency, particle size, and pH with sulphuric acid alone.

TABLE 1

|  | Dissolution yield | | | | |
|---|---|---|---|---|---|
|  | Leaching with $SO_2$ + $H_2SO_4$ | | | | |
|  | Mn | Fe | Ni | Cu | Co |
| After neutralization of ores | 1 | 0 | 1 | 1 | 0 |
| After injection of $SO_2$ | 4.3 | 0 | 9 | 2 | 1 |
| After 2 hrs of leaching | 4.7 | 0.7 | 29 | 32 | 0.6 |
| After 6 hrs of leaching | 5.1 | 3.5 | 54 | 52 | 1 |
| After 12 hrs of leaching | 5.4 | 3.3 | 60 | 57 | 1.3 |
|  | Simple sulphuric acid leaching | | | | |
| Leaching time: |  |  |  |  |  |
| After 3 hours |  |  |  | 32 | 25 |
| After 6 hours |  |  |  | 36 | 26 |
| After 12 hours |  |  |  | 44 | 32 |
| After 24 hours |  |  |  |  |  |
| After 48 hours | 1 | 1 |  | 49 | 34 |
| After 100 hours | 1 | 1 |  | 63 | 40 | 0.7 |

It is apparent from this table that the use of $SO_2$ permits a considerable acceleration of the dissolution kinetics.

EXAMPLE 2

Influence of the pH value when sulphurous anhydride is injected

Leaching operations were carried out over periods of 6 hours on the same batch of nodules and under the same conditions as in Example 1 by varying in the case of each leaching operation the pH value at the beginning of injection of 0.5 liter of sulphurous anhydride.

TABLE 2

| pH at start of injection | pH after injection | Dissolution yield | | | | |
|---|---|---|---|---|---|---|
|  |  | Mn | Fe | Ni | Cu | Co |
| 6.2 | 5 | 12.2 | 5.6 | 64 | 67.5 | 2.5 |
| 4 | 4 | 9 | 3.5 | 60 | 62 | 2.5 |
| 3 | 3.2 | 8 | 3.6 | 65 | 61 | 1.7 |
| 2 | 2.3 | 11 | 4 | 58 | 58 | 2.5 |
| 1.5 | 1.5 | 11 | 6 | 64 | 67 | 3 |

These results show that the choice of the pH of injection of sulphurous anhydride is not critical, the preferred pH values being nevertheless within the range of 1.5 to 4. In fact, at the most basic pH values, manganese dissolves more readily than nickel at the time of injection of $SO_2$. At a pH of 5.5, 9% of manganese is dissolved as compared with 4% of nickel and 0% of copper whereas 4% of manganese dissolves at a pH value of 3 as compared with 9% of nickel.

At the more acid pH values, dissolutions of nickel and of copper are highly facilitated (30% nickel, 25% copper and 9% manganese are dissolved after injection of $SO_2$ at a pH value of 2) but these dissolutions are accompanied by the dissolution of part of the iron when the percentage of manganese recovered is increased.

EXAMPLE 3

Influence of the quantity of sulphurous anhydride injected

Under conditions which are identical to those of the preceding examples, nodules were attacked with increasing quantities of $SO_2$ at a pH value of 3; after sulphuric acid leaching at a pH of 1.5, the dissolution yields of the metals were as follows:

TABLE 3

| Quantity of $SO_2$ injected in 300 g of water | pH after injection | % dissolved after injection of $SO_2$ | | | | | % dissolved after leaching (12 hours) | | | | |
|---|---|---|---|---|---|---|---|---|---|---|---|
| | | Mn | Fe | Ni | Cu | Co | Mn | Fe | Ni | Cu | Co |
| 0.25 l | 3.1 | 1.2 | 0 | 3 | 4 | 0 | 2.8 | 3 | 61 | 47 | <1 |
| 0.5 l | 3.2 | 4.3 | 0 | 9 | 4 | <1 | 8.3 | 4 | 73 | 62 | 1.2 |
| 0.75 l | 3.4 | 10 | 0 | 15 | 2.5 | 1 | 14 | 3 | 75 | 62 | 1.6 |
| 1 liter | 4.0 | 28 | 0 | 25.9 | 1.8 | 13 | | | 87 | 90.5 | 12.4 |
| 3 liters | | 72 | 0 | 72 | 0.1 | 64 | | | | | |

The dissolution percentage ratio of manganese is therefore directly related to the quantity of $SO_2$ injected and the increase in the pH value is an indication which makes it possible to control the percentage of manganese dissolved. Dissolution of the cobalt is also promoted by dissolution of the manganese.

EXAMPLE 4

Influence of the pH of the sulphuric acid leaching process

By injecting 0.5 liter of sulphurous anhydride per 100 g of nodules having a pH value of 3 and by then leaching the nodules at a pH value of 1.5 or 2 for a period of 12 hours, the following results were obtained:

TABLE 4

| | Mn | Fe | Ni | Cu |
|---|---|---|---|---|
| Leaching at pH 1.5 | 8.2 | 3.5 | 65 | 60 |
| Leaching at pH 2 | 7.8 | 0.1 | 60 | 45 |

Leaching at a less acid pH therefore makes it possible to obtain excellent selectivity for iron.

EXAMPLE 5

Influence of temperature

Injection of 0.5 liter of $SO_2$ per 100 g of nodules followed by leaching with $H_2SO_4$ at a pH value of 1.5 for a period of 6 hours.

TABLE 5

| T° | Mn | Fe | Ni | Cu | Co |
|---|---|---|---|---|---|
| 35° | 8 | 2.6 | 30 | 47 | 0.7 |
| 60° | 8 | 3.5 | 60 | 56 | 1.5 |
| 90° | 7.2 | 3.3 | 66 | 54 | 3 |

A moderate increase in the leaching temperature therefore makes it possible to accelerate the dissolution processes.

EXAMPLE 6

Influence of particle size

Injection of 0.5 liter of $SO_2$ per 100 g of nodules at a pH of 3; sulphuric acid leaching at a pH of 1.5 in 12 hours.

TABLE 6

| Particle size | Mn | Fe | Ni | Cu | Co |
|---|---|---|---|---|---|
| < 63 μ | 9 | 3.5 | 74 | 58 | 0 |
| 63–180 μ | 8.3 | 4 | 73 | 62 | 1.2 |

Very fine particle sizes are not necessary for the good performance of the method.

EXAMPLE 7

Influence of the injection of air with sulphur dioxide gas

Injection of 0.5 l of $SO_2$ per 100 g of nodules at a pH of 3; sulphuric acid leaching at a pH of 1.5 in 6 hours.

TABLE 7

| | Mn | Fe | Ni | Cu | Co |
|---|---|---|---|---|---|
| without air | 8 | 3.6 | 65 | 61 | 1.7 |
| with air | 8.9 | 2.6 | 64 | 61 | 2 |

The air which is injected with $SO_2$ does not modify the attack, results in enhanced selectivity of leaching with respect to iron and can be employed without difficulty for the agitation of the pulp.

EXAMPLE 8

Influence of the pH, of the sulphur dioxide gas and of the leaching time

Two tests performed in several stages under conditions which were identical with those of Example 1 and with sulphuric acid leachings at a pH of 1.5 or 2 and different quantities of injected sulphurous anhydride produced the results indicated in Table 8 hereunder.

TABLE 8

| Leaching pH | 1.5 | | | 2 | |
|---|---|---|---|---|---|
| Quantity of $SO_2$ injected per 100 g of nodules | 0.5 l | | | 0.5 l | |
| Stages | 1 | 2 | 3 | 1 | 2 |
| Mn | 8.3 | 9.1 | 10.7 | 7.9 | 8.5 |
| Fe | 3.3 | 5 | 7.3 | <1 | 0.5 |
| Ni | 60 | 80 | 84.5 | 61 | 66.3 |
| Cu | 57 | 69 | 76 | 40 | 47.2 |
| Co | 1.3 | 2.5 | 3.3 | 1 | 1.2 |
| Leaching pH | 1.5 | | | 1.5 | |
| Quantity of $SO_2$ injected per | | | | | |

TABLE 8-continued

| 100 g of nodules | 0.25 l | | | | 0.75 l | | | |
|---|---|---|---|---|---|---|---|---|
| Stages | 1 | 2 | 3 | 4 | 1 | 2 | 3 | 4 |
| Mn | 2 | 2.7 | 3.2 | 3.5 | 14 | 15.6 | 16.3 | 16.7 |
| Fe | 2.2 | 2.4 | 3.5 | 4.1 | 3 | 3.8 | 4.8 | 5.7 |
| Ni | 53 | 64 | 65 | 71.4 | 75 | 81.6 | 85 | 88 |
| Cu | 43.8 | 54 | 61.6 | 65.5 | 62 | 69.2 | 74 | 77 |
| Co | 0.7 | 0.9 | 1.2 | 1.4 | 1.6 | 2 | 2.4 | 2.5 |

1st stage : 12 hours of leaching
2nd stage : 6 hours of leaching
3rd stage : 6 hours of leaching
4th stage : 6 hours of leaching This method has therefore made it possible to recover in 24 to 30 hours the greater part of the nickel and the copper and the desired quantity of manganese by carrying out extremely simple leaching operations while using only a very small quantity of reagents of the order of 180 kg of $H_2SO_4$ per metric ton of nodules.

It should be pointed out that this method permits an alternative possibility of isolating part of the copper alone at the outset of the sulphuric acid leaching process. Extraction of the copper from the leach solution by a cation exchanger (of the "Lix" or "Kelex" type) accordingly makes it possible to regenerate sulphuric acid which can then be employed for neutralization of the ore. It is therefore possible by this means to reduce the consumption of acid.

The first stage of the leaching process was performed at a pH of 1.5 with an injection of 0.5 l of $SO_2$ at a pH of 3. By bringing the temperature to 35° C, preferential dissolving of the copper was thus made possible.

TABLE 9

| | Mn | Fe | Ni | Cu | Co |
|---|---|---|---|---|---|
| Percentage of metal dissolved after 3 hours of leaching | 6.8 | 1.5 | 19 | 41 | 0.7 |

After attack and liquid-solid separation, the sulphuric acid solutions to be treated had a pH of 1.5 to 2 and the following compositions:

$Fe^{III}$ ~ 0.4 g/l
Ga ~ 0.003 g/l
Al ~ 5 g/l
Cu ~ 3.2 g/l
Zn ~ 0.13 g/l
Ni ~ 4 g/l
Co ~ 0.02 to 0.5 g/l
Mn ~ 6.6 to 50 g/l
Ce ~ 0.206 g/l
La ~ 0.07 g/l
Nd ~ 0.07 g/l
K ~ 2.1 g/l
Mg ~ 6 g/l
Na ~ 6 g/l

Separation of the metals was carried out as follows:

The copper was extracted selectively by a cation exchanger of the Lix or Kelex type diluted with kerosene with heptanol or isodecanol as additive. The copper was stripped by means of the solution of copper sulphate and sulphuric acid derived from the electrolysis of copper.

Iron, gallium, aluminum and traces of chromium were then precipitated with lime between 50° and 60° C and at a pH of 3.3. The precipitate was then reduced to pulp by employing sulphuric acid at a pH of 4 in order to redissolve the nickel and the cobalt which could have been hydrolyzed in contact with the particles of lime.

The solution contained alkali metals and alkaline-earth metals, nickel, cobalt, manganese and a certain number of impurities constituted by unprecipitated traces of iron and aluminum, zinc, cerium, lanthanum and neodymium. These metals were all coextracted in a single stage. The aqueous solution having a pH of 4 was contacted with a solvent consisting of 20% D 2 EHPA (Di-2-ethylhexyl phosphoric acid) − 5% TBP (tributyl phosphate) — 75% SOLVESSO (an aromatic solvent marketed by Esso Standard Division of Humble Oil and Refining Company, although the nature of the solvents employed does not have any limitative character. Control of the pH value was ensured by employing D 2 EPHA, mostly in the sodium hydroxide form. When the exit pH value of the aqueous phase was equal to 3, the iron, aluminum, zinc and rare earths were extracted but this was not the case with the nickel, the cobalt and the manganese. In the case of small increases in pH, the manganese which was extracted prior to the nickel and the cobalt saturated the solvent and this made it possible to avoid any loss of nickel and cobalt.

All these metals with the exception of iron were then stripped with 1.5 N sulphuric acid. The iron which was stripped in a basic medium at the same time as D 2 EHPA was restored to the sodium hydroxide form and it was possible to maintain the iron in solution by means of complexing agents.

After this extraction cycle, the pH of the aqueous solution containing nickel, cobalt, manganese and the alkali metals and alkaline-earth metals was brought to a value between 3.5 and 4.

The cobalt was then extracted by a mixture of an extraction agent having a base of oxime and of a carboxylic acid. Mixtures of this type in fact make it possible to increase the extraction kinetics of cobalt to an appreciable extent and to permit stripping of this latter in a dilute acid medium as well as to achieve a considerable reduction in the kinetics of extraction of the nickel which accordingly remains in the raffinate. By way of example, mixtures of this type can consist of "Lix-63" (Tradename of General Mills, Inc. for 19-hydroxyhexatriaconta-9, 28-diene-18-oxime or 10% "Lix-64 N" (a 2-hydroxy benzophenoxime marketed by General Mills, Inc.) or 5% "Kelex-100" (β-alkenyl-8-hydroxygrunoline) mixed with 0.1 M "Versatic" acid (a mixture of $C_9$-$C_{11}$ branched-chain monocarboxylic acids) or 0.1 M naphthenic acid or α-bromolauric acid diluted in kerosene or Solvesso. This operation accordingly makes it possible to purify the nickel by withdrawing the cobalt from the aqueous phase while minimizing nickel losses.

The cobalt was stripped with sulphuric acid. The nickel was then extracted by an oxime ("Lix") or a β-alkenyl-8-hydroxyquinoline "Kelex") having a pH of 4 and stripped with an acid solution.

The manganese alone remained in the raffinate together with the alkali metals and the alkaline-earth metals. The pH of the aqueous phase was brought to the value of 8.5 by means of a basic agent and the manganese was precipitated in the form of $MnO_2$ by the oxidizing action of air.

It was possible to treat the liquid effluents in order to recycle the $SO_2$ which had been associated with the manganese. To this end, the basic agent employed at the time of precipitation of $MnO_2$ was MgO. The magnesium sulphate was then roasted in the well-known manner and $SO_2$ and MgO were regenerated.

What we claim is:

1. A method for extraction of metals from manganiferous sea nodules, wherein said method comprises the steps of:
   a. crushing of the ore;
   b. mixing the crushed ore with a first sulphuric acid solution to form a pulp;
   c. neutralizing the pulp by contact with a second sulphuric acid solution to adjust the pH of the pulp to 2 to 4, leaving substantially all the metals dissolved in the ore;
   d. introducing a controlled quantity of sulphur dioxide gas corresponding to the stoichiometry of the reaction of sulphation of manganese dioxide by sulphur dioxide at a pH value within the range of 1.5 to 4 with agitation in order to break down the structure of the neutralized ore and promote subsequent dissolution of the metals including the desired quantity of manganese;
   e. leaching the ore with sulphuric acid at a pH value within the range of 1 to 3;
   f. separating the solid and liquid phases; and
   g. separating the metals contained in the liquid phase.

2. A method of extraction according to claim 1, wherein the sulphuric acid leaching process is carried out with sulphuric acid having a pH value within the range of 1.5 to 2 at a temperature within the range of 35° to 90° C for a period of 2 to 12 hours.

3. A method of extraction according to claim 1, wherein the solution obtained on completion of step (e) is contacted with a β-alkenyl-8-hydroxyquinoline or a hydroxy-substituted oxime liquid ion exchanger to extract copper and subsequently stripping the copper from the liquid ion exchanger by contacting with a solution of copper sulphate and sulphuric acid derived from the electrolysis of copper.

4. A method of extraction according to claim 3 wherein the liquid discharged from the exchanger and no longer containing copper receives an addition of lime between 50° and 60° C at a pH equal to 3.3 in order to produce partial precipitation of iron, gallium, aluminum, chromium and is then contacted with a solvent containing 20% Di-2-ethylhexyl phosphoric acid, 5% tributyl phosphate and 75% of an aromatic solvent in order to extract the remaining iron and aluminum as well as the zinc, the rare earths and the other impurities.

5. A method of extraction according to claim 4, wherein the liquid derived from the solvent extraction process is extracted with a mixture containing a hydroxy-substituted oxime or a β-alkenyl-8-hydroxyquinoline and a naphthenic carboxylic acid to extract cobalt.

6. A method of extraction according to claim 5, wherein said method consists in contacting the liquid freed from cobalt having a pH value equal to 4 with a β-alkenyl-8-hydroxyquinoline or a hydroxy-substituted oxime to extract the nickel.

7. A method of extraction according to claim 6, wherein said method consists in oxidizing the liquid freed from nickel having a pH value equal to 8.5 in order to separate the manganese in the form of a precipitate of $MnO_2$.

8. The method of extraction of claim 1 wherein the pH of the second sulphuric acid solution added for neutralization is about 2.

* * * * *